United States Patent
Holtmanns et al.

(10) Patent No.: US 10,349,281 B2
(45) Date of Patent: Jul. 9, 2019

(54) DETECTION METHOD AGAINST CHARGING FRAUD

(71) Applicant: NOKIA SOLUTIONS AND NETWORKS OY, Espoo (FI)

(72) Inventors: Silke Holtmanns, Klaukkala (FI); Gerald Goermer, Wandlitz (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/769,462

(22) PCT Filed: Oct. 21, 2015

(86) PCT No.: PCT/EP2015/074356
§ 371 (c)(1),
(2) Date: Apr. 19, 2018

(87) PCT Pub. No.: WO2017/067588
PCT Pub. Date: Apr. 27, 2017

(65) Prior Publication Data
US 2018/0310182 A1 Oct. 25, 2018

(51) Int. Cl.
H04W 12/00 (2009.01)
H04W 12/12 (2009.01)
H04L 29/06 (2006.01)
H04W 4/24 (2018.01)
H04W 12/08 (2009.01)
H04L 12/14 (2006.01)
H04M 15/00 (2006.01)

(52) U.S. Cl.
CPC .......... *H04W 12/12* (2013.01); *H04L 12/1403* (2013.01); *H04L 12/1457* (2013.01); *H04L 63/101* (2013.01); *H04M 15/44* (2013.01); *H04M 15/47* (2013.01); *H04W 4/24* (2013.01); *H04W 12/08* (2013.01)

(58) Field of Classification Search
CPC ....... H04W 12/12; H04W 12/08; H04W 4/24; H04L 12/1403; H04L 12/1457; H04L 63/101; H04M 15/44; H04M 15/47
See application file for complete search history.

(56) References Cited

U.S. PATENT DOCUMENTS

| | | | |
|---|---|---|---|
| 8,695,097 B1 * | 4/2014 | Mathes | H04L 63/08 726/25 |
| 2001/0024950 A1 * | 9/2001 | Hakala | H04L 12/14 455/406 |

(Continued)

OTHER PUBLICATIONS

International Search Report & Written Opinion dated Apr. 11, 2016 corresponding to International Patent Application No. PCT/EP2015/074356.

(Continued)

*Primary Examiner* — Khai M Nguyen
(74) *Attorney, Agent, or Firm* — Squire Patton Boggs (US) LLP

(57) ABSTRACT

It is provided a method, comprising monitoring if a request is received, wherein the request requests to replace a stored first address of a charging system by a second address, the first address is different from the second address, and the charging system is assumed to control a primary account of a subscriber; informing that the request might be malicious if the request is received.

13 Claims, 3 Drawing Sheets

(56) References Cited

U.S. PATENT DOCUMENTS

| | | | |
|---|---|---|---|
| 2004/0153663 A1* | 8/2004 | Clark | G06Q 30/0185 726/25 |
| 2006/0009195 A1* | 1/2006 | Itoh | H04M 3/2281 455/411 |
| 2012/0129490 A1 | 5/2012 | Sharma et al. | |
| 2014/0031009 A1* | 1/2014 | Vendrow | G06Q 20/32 455/410 |

OTHER PUBLICATIONS

Karsten Nohl, "Mobile self-defense," Security Research Labs, Dec. 2014, available FTP: http://tinyurl.com/n85sxyl.

Positive Technologies (PT), "Signaling System 7 (SS7) Security Report," Sep. 2014, pp. 1-15.

Tobias Engel, "SS7: Locate. Track. Manipulate. You have a remote-controlled tracking device in your pocket," Dec. 2014, 31st Chaos Computer Club Conference (31C3), http://events.ccc.de/congress/2014/Fahrplan/system/attachments/2553/original/31c3-ss7-locate-track-manipulate.pdf.

Sergey Puzankov et al., "How to Intercept a Conversation Held on the Other Side of the Planet," Positive Technologies, May 2014; http://www.slideshare.net/phdays/phd4-pres-callinterception119.

3GPP TS 32.296 V12.4.0 (Sep. 2015), Technical Specification, 3rd Generation Partnership Project; Technical Specification Group Services and System Aspects; Telecommunication management; Charging management; Online Charging System (OCS): Applications and interfaces (Release 12), Sep. 2015.

3GPP TS 29.272 V13.3.0 (Sep. 2015), Technical Specification, 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 13), Sep. 2015.

3GPP TS 32.299 V13.2.0 (Sep. 2015), Technical Specification, 3rd Generation Partnership Project; Technical Specification Group Services and System Aspects; Telecommunication management; Charging management; Diameter charging applications (Release 13), Sep. 2015.

3GPP TS 23.060 V13.4.0 (Sep. 2015), Technical Specification, 3rd Generation Partnership Project; Technical Specification Group Services and System Aspects; General Packet Radio Service (GPRS); Service description; Stage 2 (Release 13), Sep. 2015.

Japanese Office Action corresponding to Appln. No. 2018-520491, dated Mar. 18, 2019.

* cited by examiner

DETECTION METHOD AGAINST CHARGING FRAUD

FIELD OF THE INVENTION

The present invention relates to an apparatus, a method, and a computer program product related to fraud detection. More particularly, the present invention relates to an apparatus, a method, and a computer program product related to detection of fraud and optionally protection against the fraud in a mobile communication network.

ABBREVIATIONS

3GPP 3rd Generation Partnership Project
5G 5$^{th}$ generation
AAA Authentication, Authorization, and Accounting
AVP Attribute Value Pair
CC Charging Characteristics
CCA Credit-Control Answer
CCR Credit-Control Request
CDR Call Data Record
CGF Charging Gateway Function
DRA Diameter Routing Agent
EAP AKA Extensible Authentication Protocol Authentication and Key Agreement
EPC Evolved Packet Core
GMSC Gateway MSC
GPRS General Packet Radio System
GSM Global System for Mobile Communication
GSMA GSM Association
HPLMN Home PLMN
HSS Home Subscriber Server
IDA Insert Subscriber Data Answer
IDR Insert Subscriber Data Request
IMSI International Mobile Subscriber Identity
IoT Internet of Things
IP Internet Protocol
IPSec IP Security
ISDN Integrated Services Digital Network
IWF Interworking Function
LTE Long Term Evolution
MAP Mobile Application Part
MME Mobility Management Entity
MSISDN Mobile Station ISDN number
MSC Mobile Services Switching Centre
NDS Network Domain Security
OCS Online Charging System
OFCS OFfline Charging System
PLMN Public Land Mobile Network
PS Packet Switched
RFC Request For Comments
SC Service Center
SGSN Serving GPRS Support Node
SM Short Message
SMS Short Message Service
SMSC Short Message Service Center
SRI Send Routing Information
SS7 Signalling System 7
TLS Transport Layer Security
TS Technical Specification
VPLMN Visited PLMN
WLAN Wireless Local Area Network

BACKGROUND OF THE INVENTION

The field of technology of this application is charging in LTE and 5G network and more general LTE/5G network security. Operators take now steps to harden their networks against potential attacks, in particular they look for protection against charging misuse (fraud). This becomes of critical importance for 5G networks, where a large number of devices are expected to be unattended IoT devices, where processes like billing are automated between operator and IoT owners and therefore potential attack discovery may not be immediate.

The 3$^{rd}$ Generation Partnership Project (3GPP) defines the technical framework for 5G.

According to https://en.wikipedia.org/wiki/5G, the Next Generation Mobile Networks Alliance defines the following requirements for 5G networks which are currently under standardization:

Data rates of several tens of megabits per second should be supported for tens of thousands of users 1 gigabit per second to be offered simultaneously to tens of workers on the same office floor Several hundreds of thousands of simultaneous connections to be supported for massive sensor deployments Spectral efficiency should be significantly enhanced compared to 4G Coverage should be improved Signalling efficiency should be enhanced Latency should be reduced significantly compared to LTE To transfer subscription, mobility and management information between nodes, in 5G, the Diameter protocol will likely be used. Diameter started as a authentication, authorization, and accounting protocol for computer networks. The Diameter base protocol is defined by RFC 6733 and defines the minimum requirements for an AAA protocol. Various Diameter Applications extend the base protocol by adding new commands, attributes, or both. Those Diameter applications are described in different documents e.g. by 3GPP. Diameter security may be provided by deploying IPSec or TLS.

A communication network utilizes several Diameter application protocols. One very common one is the Diameter application for the communication protocol between HSS and MME, called S6a/S6d. The Insert-Subscriber-Data-Request (IDR) command of the Diameter protocol is sent from HSS to MME or SGSN (interfaces S6a/S6d). When receiving an Insert Subscriber Data Request, the MME or SGSN shall check whether the subscriber identity (e.g. identified by IMSI) is known. The HSS may use this procedure to replace or update a specific part of the user data (=subscriber data or subscription data) stored in the MME or SGSN with the data sent, or to add a specific part of user data to the data stored in the MME or SGSN. In particular, the Insert Subscriber Data Procedure may be used between the HSS and the MME and between the HSS and the SGSN for updating certain user data in the MME or SGSN inter alia due to administrative changes of the user data in the HSS, while the user (subscriber) is located in an MME or SGSN (i.e. if the user was given a subscription and the subscription has changed). The user data may comprise an address of an OFCS and/or OCS controlling an account on which the subscriber is charged.

Security Researchers discovered substantial security vulnerabilities last year (see [1] to [3]). Mobile network operators monitored their traffic and noted that those vulnerabilities are really used by attackers and that on a "normal day" thousands of those attacks take place. The fraud and other unauthorized messages even reach millions messages over the months. Operators take now actions against those fraudsters and unauthorized network access and introduce filtering mechanisms. As a reactive measure operators developed together with the applicant material how protection can take place against the known SS7 based attacks. Some security researchers now start looking into LTE and 5G roaming, in particular Diameter security.

The operator association GSMA is developing now fine grained mechanisms to prevent the known attacks. Diameter fraud attacks are not yet visible, but there is a huge potential gain for an attacker. Therefore this invention focuses on protecting users and network against attackers that try to manipulate the user profile information.

Positive Technology Security describes an attack using MAP to avoid charging [4], but no countermeasure is proposed there. There are attacks for the older networks types (SS7/MAP, see references [1], [3], and [4]), but the protection measures there differ from the LTE and 5G networks due to different protocols and messages.

REFERENCES

[1] Engel, Tobias, $31^{st}$ Chaos Computer Club Conference (31C3), "*SS7: Locate. Track. Manipulate*", (December 2014), http://events.ccc.de/congress/2014/Fahrplan/system/attachments/2553/original/31c3-557-locate-track-manipulate.pdf
[2] Puzankov, Sergey, Kurbatov, Dimitry, PHDays 2014, "*How to Intercept a Conversation Held on the Other Side of the Planet*" (May 2014), http://www.slideshare.net/phdays/phd4-pres-callinterception119
[3] Karsten Nohl. (December 2014). "Mobile self-defense" Available FTP: http://tinyurl.com/n85sxyl
[4] Positive Technologies (PT), "*Signaling System 7 (SS7) security report*" (December 2014), http://www.ptsecurity.com/upload/ptcom/SS7_WP_A4.ENG.0036.01.DEC.28.2014.pdf

SUMMARY OF THE INVENTION

It is an object of the present invention to improve the prior art.

According to a first aspect of the invention, there is provided an apparatus, comprising monitoring means adapted to monitor if a request is received, wherein the request requests to replace a stored first address of a charging system by a second address, the first address is different from the second address, and the charging system is assumed to control a primary account of a subscriber; informing means adapted to inform that the request might be malicious if the request is received.

The apparatus may further comprise fraud prevention means adapted to apply a fraud prevention procedure on the subscriber if the request is received.

The apparatus may further comprise checking means adapted to check, if the request is received, whether the second address matches an address comprised in a predetermined list of addresses of charging systems; and inhibiting means adapted to inhibit performing the fraud prevention procedure if the second address matches one of the addresses comprised in the predetermined list.

According to a second aspect of the invention, there is provided an apparatus, comprising monitoring circuitry configured to monitor if a request is received, wherein the request requests to replace a stored first address of a charging system by a second address, the first address is different from the second address, and the charging system is assumed to control a primary account of a subscriber; informing circuitry configured to inform that the request might be malicious if the request is received.

The apparatus may further comprise fraud prevention circuitry configured to apply a fraud prevention procedure on the subscriber if the request is received.

The apparatus may further comprise checking circuitry configured to check, if the request is received, whether the second address matches an address comprised in a predetermined list of addresses of charging systems; and inhibiting circuitry configured to inhibit performing the fraud prevention procedure if the second address matches one of the addresses comprised in the predetermined list.

According to a third aspect of the invention, there is provided a method, comprising monitoring if a request is received, wherein the request requests to replace a stored first address of a charging system by a second address, the first address is different from the second address, and the charging system is assumed to control a primary account of a subscriber; informing that the request might be malicious if the request is received.

The method may further comprise applying a fraud prevention procedure on the subscriber if the request is received.

The method may further comprise checking, if the request is received, whether the second address matches an address comprised in a predetermined list of addresses of charging systems; and inhibiting performing the fraud prevention procedure if the second address matches one of the addresses comprised in the predetermined list.

The method may be a method of fraud prevention.

In the apparatus according to any of the first and second aspects and the method according to the third aspect, the fraud prevention procedure may comprise one or more of the following:
  triggering to run a credit control of the primary account of the subscriber;
  inhibiting replacing the first address by the second address;
  activating a backup account of the subscriber in the charging system, wherein the backup account corresponds to the primary account; and charging the backup account for charging events of the subscriber;
  spoofing a source of the request as if the first address was replaced by the second address according to the request;
  blacklisting a source address of the request;
  locking the primary account of the subscriber; and
  generating a silent alarm.

According to a fourth aspect of the invention, there is provided a computer program product comprising a set of instructions which, when executed on an apparatus, is configured to cause the apparatus to carry out the method according to the third aspect. The computer program product may be embodied as a computer-readable medium or directly loadable into a computer.

According to some example embodiments of the invention, at least one of the following technical effects is provided:
  fraud is early detected;
  fraud may be prevented;
  fraud prevention may be achieved regardless of whether or not IPsec or TLS are implemented.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of example embodiments of the present invention which is to be taken in conjunction with the appended drawings, wherein.

DETAILED DESCRIPTION OF CERTAIN EXAMPLE EMBODIMENTS

Figure 1:
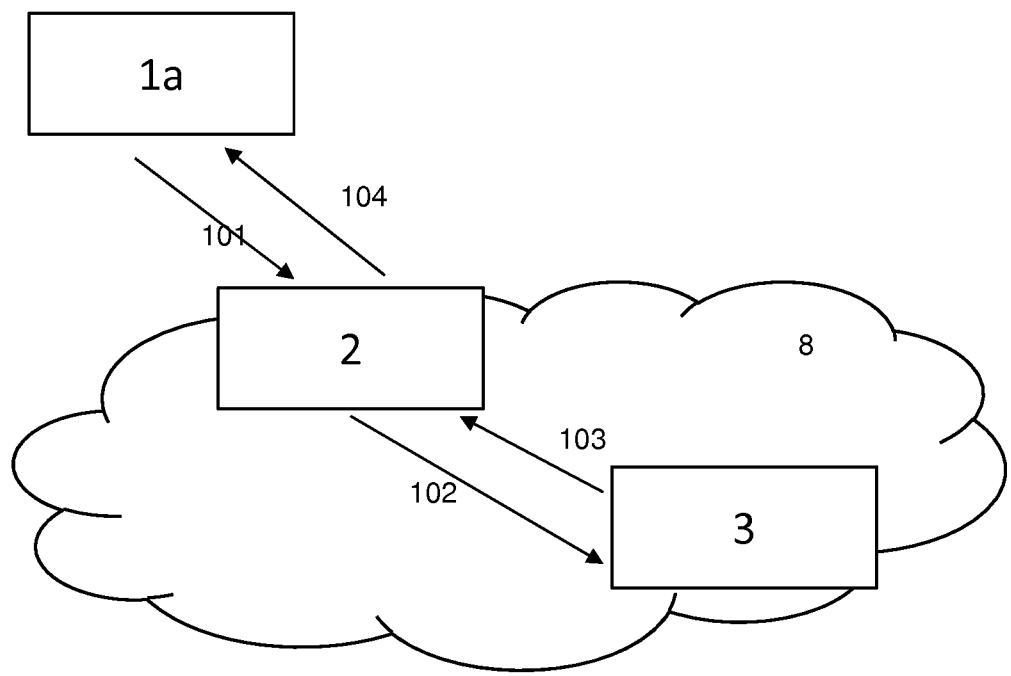
FIG. 1 shows a message flow of a fraud attempt.

Herein below, certain example embodiments of the present invention are described in detail with reference to the accompanying drawings, wherein the features of the example embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

In our study, we found three ways to exploit the Diameter protocol in a fraudulent way:
An attacker avoids charging for pre-paid account;
An attacker avoids charging for a post-paid account; and
An attacker can convert a pre-paid account to avoid charging.

Some embodiments of the invention provide countermeasures against those three attacks.

According to some embodiments of the invention, the following assumptions on the operator network protection are made. However, these assumptions are not compulsory conditions for embodiments of the invention. Discussions with operators and security companies, investigations in operator interworking material etc. showed that those assumptions are for most network operator very realistic (not all operators are documented) and were confirmed verbally in unofficial communications. Due to the large potential financial impacts, hardly any operator or interconnection provider would state their vulnerability officially.

IPSec is often not used (in particular for interconnections)). NDS/IP network layer security according to 3GPP TS 33.210 is often not used on the roaming interface. Other security protocols e.g. TLS are rarely used. Technically, this may mean that:
Data is either completely send in clear text;
Zero-key is used;
No filtering is done on the interconnect
 No IP address filtering (white/blacklist);
 No partner address book or hard coded return addresses;
 No access control list is used (note, that this assumption is only helpful for one of the attacks).
The Diameter Routing Agent adds his own header and forwards the received messages to the correct node.

It should be noted, that the some of the attacks described below are still possible, even if those security methods are deployed. Just, if the above assumptions hold for a network, then it can be considered highly vulnerable. If an operator deploys one or more of the methods above, the attack becomes harder. Many of the assumptions above are hard to believe for experts coming from the Internet environment, but one has to consider that telecommunications networks were till recently a closed SS7 system with no additional security requirements at all and is now slowly evolving.

In general, the identified fraudulent ways are identified:
An attacker avoids charging for pre-paid account;
An attacker avoids charging for a post-paid account;
An attacker can convert a pre-paid account to avoid charging;
These attacks above work as follows:
The attacker replaces the valid OCS address with a pseudo OCS address (e.g. Alternative Roaming Provider OCS address) and can consequently get the service started if the subscribers own account even if his account does not have sufficient deposit. In the European Union (EU), this fraud is limited by the EU roaming regulations;
Exchange of the valid OFCS address with an invalid OFCS address leads to the aggregation of charging data to an invalid Charging System. The reconstruction effort in the Billing System is more expensive. Therefore the usage charging request might be ignored for a certain time;
Exchange of the valid OCS address with an OFCS address leads to the aggregation of charging data to an invalid Charging System. The collection in the Billing System will discover the misuse during the monthly cross check aggregation.

In some cases, the attacker may find out a way to get a valid OCS or OFCS address and replace the correct OCS address or OFCS by the valid (but incorrect) OCS address or OFCS such that another account owner may be charged for service usage. In case of replacing by a valid OCS address, the fraud may be observed in real-time by the demanded account owner and, thus, stopped immediately. Replacement by a valid OFCS address can have a longer life time because the faulty requests will be identified only after service usage during the monthly post-aggregation in the Billing System. Therefore, the cheated user account has a limited ability to get the fraud compensated.

The three potential attacks all have an information collection phase (called Phase I) that may be the same (see FIG. 1):

As shown in FIG. 1, the attacker 1a acts as SMS GMSC. For this, he has to know MSISDN of the user and the address of the DRA 2 (optional, see below). The attacker 1a sends (spoofing to be a SMS GMSC) a Diameter Send Routing Info comprising the MSISDN and the address of an SC (SMSC) for a SM Request to DRA (101). The address of the SC may be arbitrary and need not to be an address of a real SC. The cloud 8 indicates the domain of the operator, whereof DRA 2 is the gateway to Diameter external entities such as a SMSC. The DRA 2 forwards the Send Routing Info to HSS 3 (102).

In response to the Send Routing Info 102, the HSS 3 provides, via DRA 2, to the attacker 1a (spoofing to be a SMS GMSC) the following information with the Result code DIAMETER_SUCCESSFUL (messages 103, 104): IMSI; MSISDN; and an identity of one serving node (e.g. MSC, SGSN or MME) on which the user is registered. Hereinafter, a SGSN 4 is taken as an example of a serving node, but embodiments of the invention apply to other kinds of serving nodes, too.

Thus, the attacker learns, in addition to MSISDN and address of DRA 2, IMSI, HSS address, an identity of at least one serving node of the subscriber.

This information is sufficient to perform at least one of the following attacks.

There are other options for the attacker to get this information or parts of thereof. For example:
- Using a false base station to acquire the IMSI;
- Using a WLAN access point and run EAP_AKA;
- Sending a MAP messages SRI_SM or SRI or SRI_GPRS to an interworking function;
- Hacking a database comprising information on roaming agreements between operators such as the GSMA IR.21 database;
- Getting physical access to a phone and requesting the IMSI from the user interface; and
- Stealing IMSI list from smart card companies directly or while they transfer the information to the operator.

Figure 2:
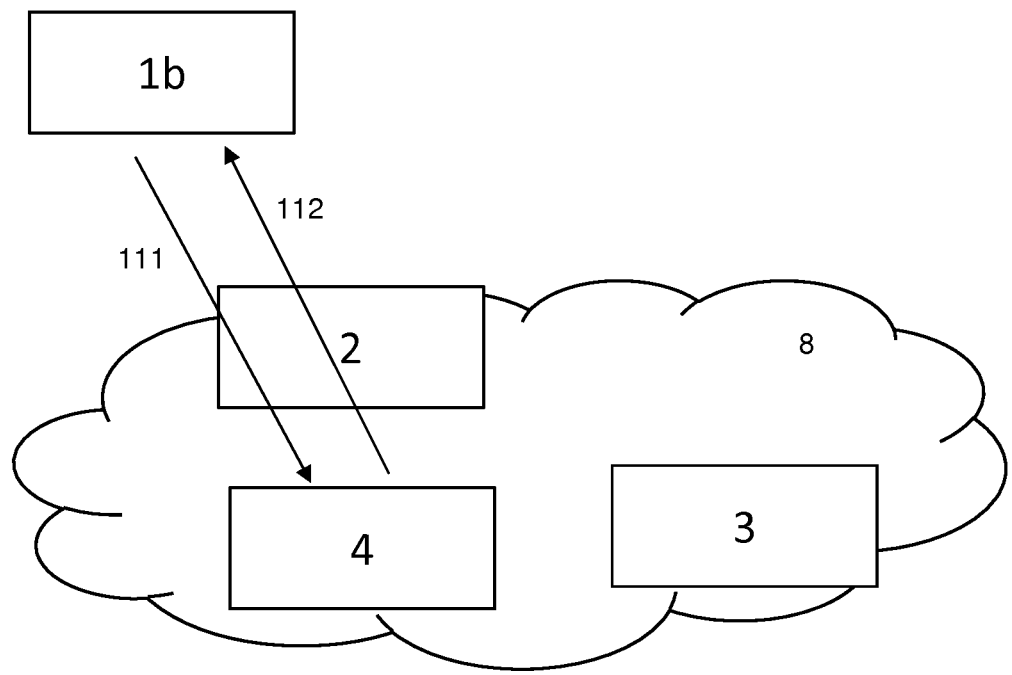
FIG. 2 shows a message flow of a fraud attempt.

The first attack is preventing billing by resetting OFCS address (see FIG. 2). In this attack, the attacker 1b acts as HSS. I.e., the attacker 1a of FIG. 1 has changed its role from SMS GMSC to HSS and is now designated as attacker 1b. In this context it is noted that the role of the attacker as SMS GMSC or as HSS requires only that the attacker provides messages to DRA 2 as expected for a corresponding network element. It is neither necessary that the attacker provides the internal functionality of a SMS GMSC or HSS, nor that the attacker provides an interface to other network entities than DRA 2.

According to the description above, attacker 1a is the same as attacker 1b. However, they may be different from each other if the required information is transferred from attacker 1a to attacker 1b.

As shown in FIG. 2, the attacker 1b spoofing to be a HSS sends an Insert Data Request (IDR) 111 with the IMSI to the serving node, e.g. to SGSN 4. The IMSI and the identity of the serving node may be known from messages 103, 104 of FIG. 1. IDR 111 comprises subscription data which include at least 3GPP Charging Characteristics (CC), such as an address of the OFCS for offline charging. By IDR 111, the attacker 1b requests to set the address of the OFCS stored in the serving node (SGSN 4) to a fake address such as the address of the attacker server.

In response, the SGSN 4 may send an acknowledgement (IDA 112) with result code: DIAMETER_SUCCESS.

A server at the fake address (e.g. Attacker 1b) also provides an interface to SGSN 4 in order to spoof being an OFCS. Thus, from the perspective of SGSN 4, the server at the fake address is a valid OFCS, although the server at the fake address may not provide any other functionality of an OFCS than the interface. E.g., it may simply discard the received CDRs. As a consequence, the user of the MSISDN (and IMSI) now has free service usage until the data in SGSN 4 are reset.

The second and third attacks attempt to provide free service to pre-paid users.

Figure 3:
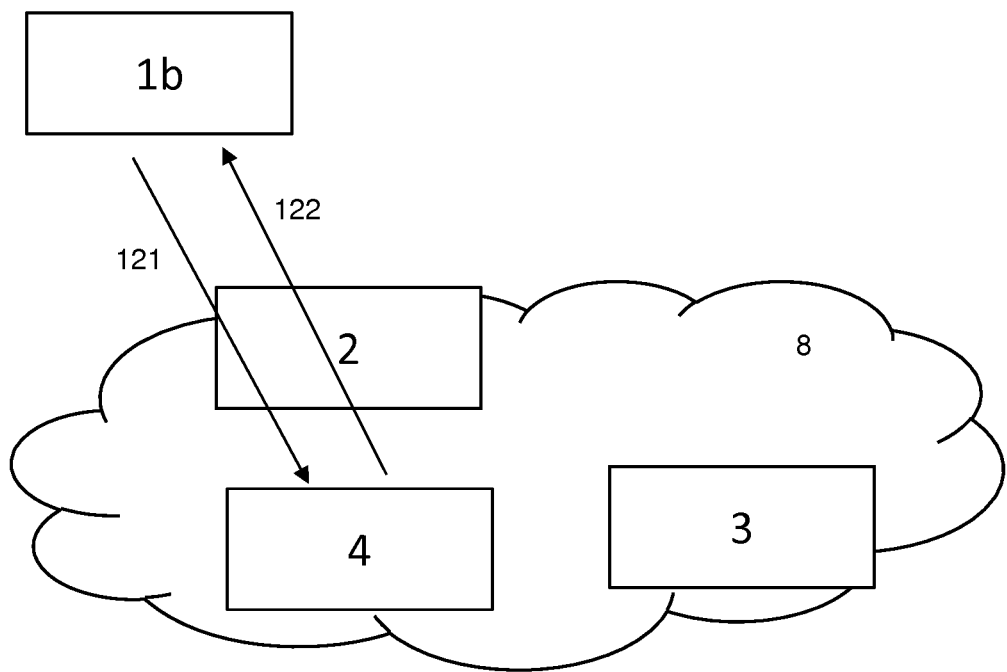
FIG. 3 shows a message flow of a fraud attempt.

FIG. 3 shows a second attack which the attacker 1b (spoofing to be a HSS) may perform based on the information obtained by attacker 1a of FIG. 1 (which may be the same as attacker 1b or different from it). In this attack, the OCS address is reset in the serving node (e.g. SGSN 4).

As shown in FIG. 3, the attacker 1b spoofing to be a HSS sends an Insert Data Request (IDR) 121 with the IMSI to the serving node, e.g. to SGSN 4. The IMSI and the identity of the serving node may be known from messages 103, 104 of FIG. 1. IDR 121 comprises subscription data which include at least 3GPP CC, such as an address of the OCS for online charging. By IDR 121, the attacker 1b requests to set the address of the OCS stored in the serving node (SGSN 4) to a fake address such as the address of the attacker server.

In response, the SGSN 4 may send an acknowledgement (IDA 122) with result code: DIAMETER_SUCCESS.

A server at the fake address (e.g. Attacker 1b) also provides an interface to SGSN 4 in order to spoof being an OCS. In particular, the server at the fake address confirms to SGSN 4 that the user has sufficient credit on his account. Thus, the user may use services for free until the fraud is detected.

The second attack might be detected quickly. Therefore, the third attack might be more favourable for pre-paid users.

Figure 4:
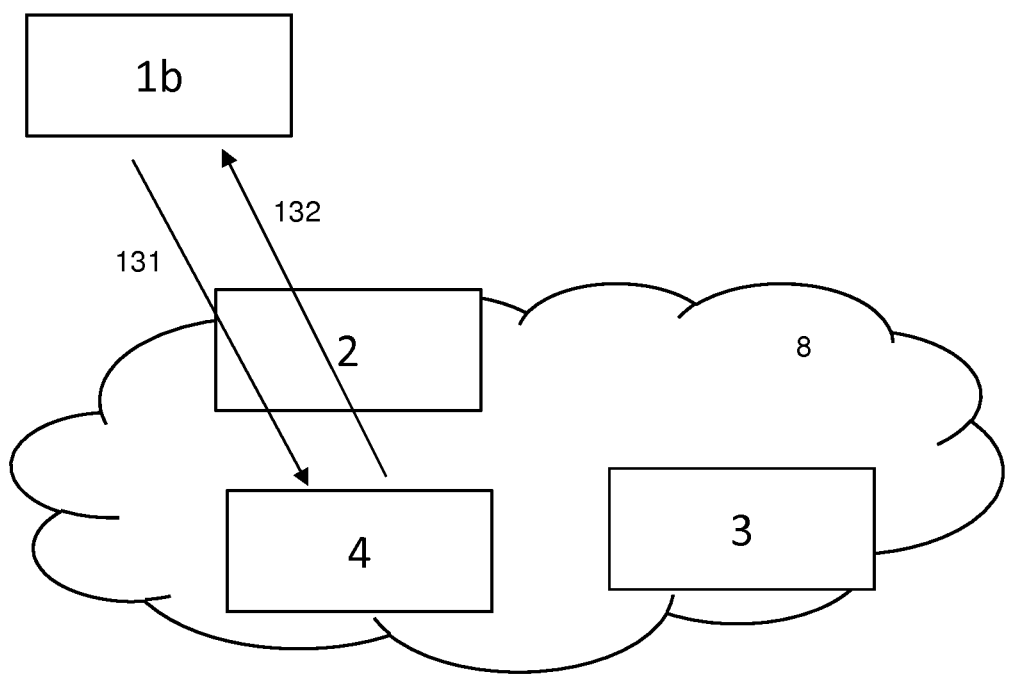
FIG. 4 shows a message flow of a fraud attempt.

FIG. 4 shows a third attack which the attacker 1b (spoofing to be a HSS) may perform based on the information obtained by attacker 1a of FIG. 1 (which may be the same as attacker 1b or different from it). In this attack, the OCS address is reset in the serving node (e.g. SGSN 4).

As shown in FIG. 4, the attacker 1b spoofing to be a HSS sends an Insert Data Request (IDR) 131 with the IMSI to the serving node, e.g. to SGSN 4. The IMSI and the identity of the serving node may be known from messages 103, 104 of FIG. 1. IDR 131 comprises subscription data which include at least 3GPP CC. In the third attack, IDR comprises only an address of an OFCS and does not comprise an address of an OCS. Thus, the pre-paid user with the MSISDN is made a post-paid user from the perspective of the SGSN 4. In the third attack, the address of the OFCS provided by IDR 131 is a fake address such as the address of attacker 1b.

In response, the SGSN 4 may send an acknowledgement (IDA 132) with result code: DIAMETER_SUCCESS.

The user may use services without being charged until the data in SGSN are reset.

Potentially, the operator may detect the attacks e.g. during the monthly generation of the bill for the subscriber.

Namely, typically, there are some runs during the monthly generation of the bill for the subscriber with cross check to other recorded records, in particular cost related records, e.g. roaming records for inter-operator accounting.

If the OFCS address is replaced by the attacker with a fake IP address, in case of decentralized collection of the CDRs via Diameter, all charging events will be redirected to the server at the fake address with no immediate impact.

If a centralized collection is deployed, all charging events will be aggregated and correlated into records by Charging Gateway Function (CGF) which forwards the resulting CDRs to the post-processing system.

In the case of an attack on a network element connected to a CGF, the CGF does not forward the CDRs to the Charging System because of the not valid OFCS IP address. Consequently, an error occurs and a Fault Management System may be involved, e.g. with the consequence to block the subscribers account. This might occur in parallel with the monthly run for the bill by the Billing System.

For the decentralized collection of CDRs, no CDRs are generated against the "real" subscriber's account directly. However, other CDRs exist which are generated by other service nodes, e.g. Gateway records or application server records. These CDRs are generated for consistency and may be used for a cross check e.g. in case of cost split between mobile network operator and service provider. Typically, but not necessarily, such a consistency check may run at the end of the month. By such consistency check, the attack may be detected and an error may be raised. In consequence, the Fault Management System may e.g. drop the subscriber from the system by barring the subscriber's account or by deleting the subscription.

As explained above, a faked OFCS address could lead either to redirect of the charging events by the Diameter accounting application in case of a decentralized configuration or to aggregate the GTP records in case a centralized configuration for an invalid charging system in the CGF. A delay of the fraud observation in the Billing system is guaranteed because the protocols act in one direction only, i.e. just for the collection.

For a faked OCS address the charging method is more sensitive because of another used Diameter Credit-Control Application, which interacts bi-directional and in real-time. Therefore, any manipulation may be observed in the network even if other online charging dialogs are in progress at the same time. That is, attacks may be immediately identified and the fault management system may act accordingly.

In case of the replacement of the OCS address by a faked address ("Hacker-OCS"), the subscriber may use the service free of charge if the Hacker-OCS is able to reply a valid Diameter Credit-Control Answer (CCA) message with sufficient Granted Service Units (GSU) for the requested service identified by the corresponding Rating Group in the received Diameter Credit-Control Request (CCR) message. I.e., the Hacker-OCS must be able to analyze the received Diameter CCR messages and convert all details in an appropriate Diameter CCA message back to the service node. This may work as long as no other involved service node requests a GSU at a service request or submits the corresponding CDR after service usage for the statistic and cross check to the Billing System.

If the OCS address is a valid IP address, e.g. in case of roaming regulation, the roaming service node will either the check the consistency of the GSU (e.g., usually a subscriber in holiday has a certain amount of talk time, SMS or data volume and not endless talk time, infinite number of SMS or data volume) in the roaming service node. Thus, the Billing System will likely identify, by means of the generated roaming CDRs, the fraud during the monthly cross check for the inter-operator accounting.

The usage of IPSec according to NDS/IP provides some protection (in real implementations of today, it typically does not help, because most operators use the service of roaming hops and diameter has hop-by-hop security and only the first leg is assured), as does white and blacklisting. A similar problem occurs for IP white/blacklisting, when an attacker "hides" behind a roaming hub.

But even with those measures source address spoofing is still possible and the attacks are still possible. The need to support non-LTE/5G operators may require that operators have to deploy Inter-Working Functions (IWF), which will result, that the presented attacks are possible using the IWF.

Because such an attack could not be fully prevented without impacting roaming arrangements, some embodiments of this invention are related to reduce the impact of the violation to the operators configuration, for example in case of charging system or billing system address reset for post-paid (OFCS) or for pre-paid (OCS) users and change of charging method from pre-paid to post-paid.

Some embodiments of the invention provide a potential prevention of at least one of the following attacks:
 Prevention of billing avoidance for pre-paid customer
 Prevention of billing avoidance for a post-paid customer
 "Upgrading" a pre-paid customer to a post-paid customer
 Examples of these attacks are described in detail hereinabove.

In general, any attack observation should preferably not be notified for the attacker. It may trigger activities on different levels which could be just the pretend of the change and/or sending a silent alarm.

When an IDR command is received, an initial check is made if it requests an update of the OFCS/OCS address or the replacement of the OCS with the OFCS address, which he might get from hacking the IR.21 GSMA database. If such an activity is detected, according to some embodiments of the invention, at least one of the following checks may take place to obtain a score on the trustworthiness of the IDR message:
 Validation if the sending IP is of a correct node type (e.g. SGSN, MME, HLR, etc.) (i.e. only particular node types are allowed to send an IDR command, this check validates, if the right node type has send an IDR command). Note that the message contains which node type e.g. MME, SGSN is the sender of the message. This type of check might not be helpful if the attacker configures the server at the faked address such that it provides the "correct" node type in the message.
 The OFCS address may be updated or OCS address may be changed as requested by IDR command and, at the same type, a back-up account is created for fall-back purpose. The back-up account corresponds to the account ("primary account") of the user of the MSISDN. All charging events will then be charged to the backup account such that the backup account is correct.
 A pre-paid test OCS charging may be performed to that user and the OCS address indicated in IDR and a Credit-Control run is made (the account could be checked with the event based Balance Check). If the Credit-Control run is NOT successful, then the IP address is noted (potentially recorded as blacklisted). Running credit control based on the replacement of the OCS address is a quite critical step. This is an extra run, since credit control runs usually would take place at the end of the month only.
 In addition the answers to the attacker may be performed as the attacker expects.
 A cross check with an existing fraud database on potential matching attack may be performed.
 The requesting IP address (IP address of the attacker) may be added to the blacklist
 The pre-paid account may be locked.
 In addition of a non successful test of the OCS address the IP address of the attacker may be forwarded to one or more blacklist partners for verification (the node of the partner might just have been hacked). The information related to that attack i.e. the technical signature and behaviour could be automatically uploaded to the Fraud database maintained e.g. by GSMA, where other partners can download the latest signature file then.
 A (silent) alarm to the Fraud management system maybe generated.

According to some embodiments of the invention, an OCS change or OFCS change may trigger a silent alarm and the new address may be validated against a list of valid OCS addresses or OFCS addresses. If the changed OCS address or OFCS does not match an entry of the valid addresses, fraud prevention processes may start. Otherwise, if there is a match, one may assume that the IDR message was not fraudulent such that fraud prevention processes need not to be started.

Preferably, the behaviour according to some embodiments of the invention may be standardized by 3GPP. The description for receiving an Insert Subscriber Data Request in EPC nodes (e.g. SGSN) in 3GPP TS 23.060 section 6.11.1.1. "IDS procedure" does not allow an extension. Accordingly, a right place for standardization may be 3GPP TS 29.272 section 5.2.2.1 "IDS structure" and 7.3.2 "Subscription Data (3GPP-CHCA)". Below an example is shown where the new methods would be anchored in the existing specifications. The added portion is written in italics.

5.2.2.1 Insert Subscriber Data
5.2.2.1.1 General

The Insert Subscriber Data Procedure shall be used between the HSS and the MME and between the HSS and the SGSN for updating and/or requesting certain user data in the MME or SGSN in the following situations:

due to administrative changes of the user data in the HSS and the user is now located in an MME or SGSN, i.e. if the user was given a subscription and the subscription has changed;

5.2.2.1.2 Detailed Behaviour of the MME and the SGSN

When receiving an Insert Subscriber Data request the MME or SGSN shall check whether the IMSI is known.

At this point in the spec one may require a mandatory credit control run for the case of an ISD message with OCS address change.

5.2.2.1.4 Detailed Behaviour in Case of Extraordinary Trigger of the MME and the SGSN When receiving an Insert Subscriber Data request the MME or SGSN beside the regular identified situations a fraud prevention procedure may applies.

If 3GPP-Charging-Characteristics AVP are present in the Subscription-Data AVP which are different to the stored content receive in the previous request the MME or SGSN will ignore the change but reply with no error indication and spoof the successful replacement. Additionally could at the same time a silent alarm inform the Fraud Management for further actions.

As an additional measure, one may mandate 3GPP TS 32.296/3GPP TS 32.299 to link the CCR[Event(Balance-Check)] in OCS with an external notification.

Figure 5:
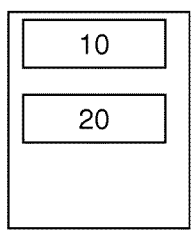
FIG. 5 shows a message flow of a fraud attempt.
Figure 6:
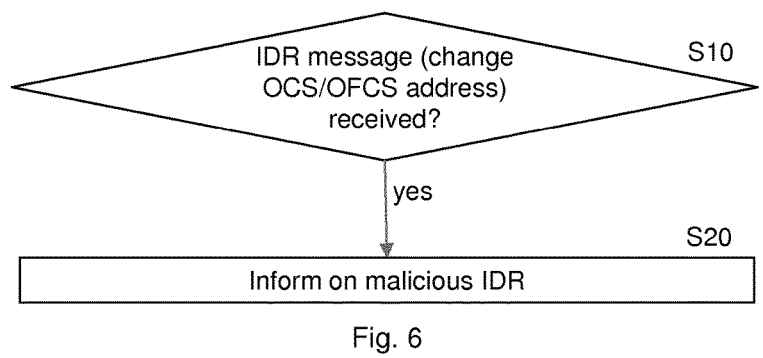
FIG. 6 shows a message flow of a fraud attempt.

FIG. 5 shows an apparatus according to an example embodiment of the invention. The apparatus may be a serving node such as a SGSN, MSC, MME, or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises monitoring means 10, and informing means 20. The monitoring means 10 and informing means 20 may be a monitoring circuitry and informing circuitry, respectively.

The monitoring means 10 monitors if a request is received (S10). The request requests to replace a stored first address of a charging system by a second address. The stored first address is different from the second address. The charging system is assumed to control a primary account of a subscriber. The request may be e.g. an IDR message.

If the request is received (S10="yes"), the informing means 20 informs that the request might be malicious (fraudulent) (S20).

Figure 7:
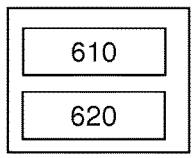
FIG. 7 shows a message flow of a fraud attempt.

FIG. 7 shows an apparatus according to an example embodiment of the invention. The apparatus comprises at least one processor 610, at least one memory 620 including computer program code, and the at least one processor 610, with the at least one memory 620 and the computer program code, being arranged to cause the apparatus to at least perform at least the method according to FIG. 6 and related description.

Instead of the Diameter protocol, in some embodiments of the invention, another protocol capable of submitting and replacing subscription information may be used, such as RADIUS. Instead of IMSI, another subscriber identification may be used, e.g. a T-IMSI or an MSISDN.

The check if an IDR message is potentially malicious may be performed at the addressee of the IDR request (e.g. MME or SGSN), at an intermediate node through which the IDR message passes (e.g. a DRA) or it might be performed in a separate device for supervising the network traffic (at least some or all of the control messages such as the IDR message).

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

Some example embodiments of the invention may be applied to a 3GPP network (e.g. LTE, LTE-A, or a 5G network), as described hereinabove. However, some example embodiments of the invention may be applied to any kind of network wherein 3GPP CC data are stored in a node servicing a subscriber.

In FIGS. 1 to 4, a DRA 2 is shown. However, the DRA 2 is optional. The respective messages may be exchanged directly between the communication partners without being relayed by the DRA 2. Accordingly, if DRA 2 is not available or by-passed, the respective attacker 1a to 1d needs to know the address of the (final) addressee of the respective message.

A terminal may be any kind of terminal which may attach to the respective network. E.g., a terminal may be a UE, a device of a machine-type communication, a laptop, a smartphone, a mobile phone etc.

According to the above description, it should thus be apparent that example embodiments of the present invention provide, for example a network node such as a MME or a SGSN or a DRA, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a network traffic supervising device, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, entities, units, devices, or methods include, as non-limiting examples, implementations as hardware, software, firmware, special purpose circuits or logic, general purpose hardware or controller or other computing devices, a virtual machine, or some combination thereof.

It should be noted that the description of the embodiments is given by way of example only and that various modifications may be made without departing from the scope of the invention as defined by the appended claims.

The invention claimed is:

1. Apparatus, comprising:
    monitoring means adapted to monitor if a request is received, wherein the request requests to replace a stored first address of a charging system by a second address, the first address is different from the second address, and the charging system is assumed to control a primary account of a subscriber;
    informing means adapted to inform that the request might be malicious if the request is received; and
    fraud prevention means adapted to apply a fraud prevention procedure on the subscriber if the request is received, wherein the fraud prevention procedure comprises
        activating a backup account of the subscriber in the charging system, wherein the backup account corresponds to the primary account; and
        charging the backup account for charging events of the subscriber.

2. The apparatus according to claim 1, wherein the fraud prevention procedure comprises triggering to run a credit control of the primary account of the subscriber.

3. The apparatus according to claim 1, wherein the fraud prevention procedure comprises
    inhibiting replacing the first address by the second address.

4. The apparatus according to claim 3, wherein the fraud prevention procedure comprises
    spoofing a source of the request as if the first address was replaced by the second address according to the request.

5. The apparatus according to claim 1, wherein the fraud prevention procedure comprises at least one of
    blacklisting a source address of the request;
    locking the primary account of the subscriber; and
    generating a silent alarm.

6. The apparatus according to claim 1, further comprising:
    checking means adapted to check, if the request is received, whether the second address matches an address comprised in a predetermined list of addresses of charging systems; and
    inhibiting means adapted to inhibit performing the fraud prevention procedure if the second address matches one of the addresses comprised in the predetermined list.

7. Method, comprising:
    monitoring if a request is received, wherein the request requests to replace a stored first address of a charging system by a second address, the first address is different from the second address, and the charging system is assumed to control a primary account of a subscriber;
    informing that the request might be malicious if the request is received; and
    applying a fraud prevention procedure on the subscriber if the request is received, wherein the fraud prevention procedure comprises
        activating a backup account of the subscriber in the charging system, wherein the backup account corresponds to the primary account; and
        charging the backup account for charging events of the subscriber.

8. The method according to claim 7, wherein the fraud prevention procedure comprises triggering to run a credit control of the primary account of the subscriber.

9. The method according to claim 7, wherein the fraud prevention procedure comprises inhibiting replacing the first address by the second address.

10. The method according to claim 9, wherein the fraud prevention procedure comprises
    spoofing a source of the request as if the first address was replaced by the second address according to the request.

11. The method according to claim 7, wherein the fraud prevention procedure comprises at least one of
    blacklisting a source address of the request;
    locking the primary account of the subscriber; and
    generating a silent alarm.

12. The method according to claim 7, further comprising:
    checking, if the request is received, whether the second address matches an address comprised in a predetermined list of addresses of charging systems; and
    inhibiting performing the fraud prevention procedure if the second address matches one of the addresses comprised in the predetermined list.

13. A computer program product embodied on a non-transitory computer-readable medium, said product comprising a set of instructions which, when executed on an apparatus, is configured to cause the apparatus to carry out the method according to claim 7.

* * * * *